July 31, 1956 R. H. RANGER 2,757,242

MAGNETIC SOUND RECORDING AND REPRODUCING APPARATUS

Filed March 6, 1950 3 Sheets-Sheet 1

INVENTOR.

Richard H. Ranger

July 31, 1956 R. H. RANGER 2,757,242

MAGNETIC SOUND RECORDING AND REPRODUCING APPARATUS

Filed March 6, 1950 3 Sheets-Sheet 2

INVENTOR.

Richard H. Ranger

July 31, 1956 R. H. RANGER 2,757,242

MAGNETIC SOUND RECORDING AND REPRODUCING APPARATUS

Filed March 6, 1950 3 Sheets-Sheet 3

INVENTOR.
Richard H. Ranger

United States Patent Office 2,757,242

Patented July 31, 1956

2,757,242

MAGNETIC SOUND RECORDING AND REPRODUCING APPARATUS

Richard H. Ranger, Newark, N. J.

Application March 6, 1950, Serial No. 147,816

11 Claims. (Cl. 179—100.2)

This invention relates to magnetic tape equipment, and in particular to a novel arrangement of the magnetic heads and of the tape drive such that a very constant but regulatable movement of the tape is made across these heads.

The usual magnetic tape unit consists of a tape supply reel from which the tape is released. A flywheel then is used to reduce the effect of fluctuations from the supply reel acting on the tape as it passes by the magnetic heads. The tape drive usually consists of a synchronous motor with a capstan, or pulley, on its extended shaft with a rubber idler gripping the tape to the capstan. The synchronous motor capstan and the idler are very effective in preventing any fluctuations from the take up reel from passing back to the movement of the tape across the heads. But the flywheel is not very effective in preventing fluctuations from the supply reel from affecting the movement of the tape across the heads. It is the plan of this invention to make double use of the effective filtering action of the capstan and idler by having the tape pass the same capstan as it enters in a loop to pass around the heads and then by having it pass out by the same capstan. Separate idlers press the tape to the same capstan one to a side for this double action.

It is not new to use a record medium in such a loop either in motion picture technique or in magnetic recording. However, this method has not proven satisfactory heretofore for tape, and the novelty of this invention consists in modifying the capstan to make the tape enter this loop at a slightly lower speed than that at which it leaves. The net result is that there is tension inside this loop. This tension makes the tape hug the magnetic heads with a uniform distribution of the forces in this loop from the point where the tape enters the loop to the point at which it leaves. This is accomplished by making the capstan driving the tape in conical form and so regulating the movement of the tape by the capstan that the tape enters from the supply reel at a slightly smaller diameter on this conical capstan than the diameter at which it leaves the loop.

Flywheels are also standard in tape recording equipments, but in this invention, the main flywheel is placed in absolutely the most advantageous position to insure smooth reproduction by placing it as near as possible to the recording head and playback head. Actually, this is accomplished by placing this flywheel between the record and playback heads.

Tests have indicated that the most critical head in the normal magnetic recording sequence is the record head. This is no doubt due to the fact that the trailing edge of the gap in the record head is the controlling element in recording, and as this is theoretically a knife edge, obviously its resolution is very great and any irregularities in tape movement will communicate themselves immediately to the recorded tape at this point. In playback, however, while it is essential that the speed also be as constant as possible, nevertheless, the total magnetic effect is integrated over the complete gap width in the playback head, so that there is not quite as fine a resolution in the playback head as there is in the recording operation. So the record head is given priority in closeness to the flywheel capstan.

It is much better to leave the tape threaded in the same manner both for operation and rewind. But it is also wise to remove the tape from active contact with the heads on fast rewind to avoid excessive wear on heads and tape. This is accomplished in this invention by the expedient of moving the playback and synchronizing heads away from the tape and by moving a tape guide which holds the tape against the erase and record heads, away from the tape, so that the latter no longer bears against the heads. At the same time, the flywheel is disengaged from its capstan, so that the tape will no longer be held back by the flywheel.

Also this movement causes an indicator to come up behind the tape at exactly the point corresponding to the gap in the normal sound playback head. This indicator greatly facilitates editing, cutting, splicing and cueing tape with reference to the active gap in the playback head.

As magnetic tape recorders are now coming into increasing use for recording and playing of sound for motion pictures, it is becoming increasingly important to regulate the rate of travel of the tape to be sure that it synchronizes perfectly with the motion pictures. In my copending application Serial Number 84,510 the idea of recording not only the sound on quarter inch wide, two mil thick magnetic tape, but also a control signal to establish strict timing is covered. The invention herein described provides a more stable tape movement to insure that the technique established in my previous application is given a more solid foundation of uniform speed to make speed correction less of a problem.

Also the synchronizing heads are placed in a novel sequence in regard to the tape travel. While it is perfectly possible to use a single synchronizing head for the recording of the synchronizing signal as given in my co-pending application Serial Number 84,510 and the same head for the playback of this synchronizing signal, it has been found in practice that it is better to have two separate heads, one for playback and one for recording the synchronizing signal. Also it has proven advantageous to have the playback synchronizing signal head first in line for all of the magnetic heads, even ahead of the erase head. This is done in order that the synchronizing playback will have the opportunity to regulate the speed of the tape which has previously had the synchronizing signal recorded on it, even although the tape is to be erased and a new recording is to be made on the tape. The normal sound recording heads follow in their usual order—erase, record and playback. But the main flywheel comes between the record and playback heads. Then finally comes the synchronizing record head.

This makes the basic plan of this invention to be the formation of an active, or operative, loop of tape starting with a synchronous motor capstan and the incoming tape held against this capstan, then in succession the synchronous playback head, the erase head, the normal sound recording head, then the flywheel; this is then followed by the normal sound playback head and finally by the last of the magnetic heads, the synchronizing record head. The tape then leaves the active loop by passing out on the other side of the synchronous motor capstan against which it is held by another rubber idler.

Regulation of the speed of the tape transport is also an important part of this invention so that the tape speed may be corrected to bring it in line with the movement of other material such as motion picture film. This is accomplished in this invention by separating the synchronous motor from the capstan driving the tape by a rim driven flywheel of much the same type as has been used for years in disc recording. However, there is a basic difference. The synchronous motor is provided with a conical capstan instead of a straight cylindrical capstan and in turn the rubber internal rim drive on the flywheel is made conical to conform to this capstan in such a manner that the actual peripheral speed of the capstan contacting the rubber drive is altered although the main motor speed may remain constant. The net result is that the tape drive can be increased or decreased by this shifting of the drive motor to compensate for tape shrinkage or stretch or for any irregularity in the speed of the tape with respect to the equipment with which it is to operate synchronously.

The object of this invention is therefore, to provide a very stable tape transport around a series of magnetic heads arranged in a manner to promote quality and ease of synchronization.

An object of this invention is the provision of tape-driving means for tape recorders, said means comprising a pair of spaced idler pulleys in circumferential contact with the tape, and a power-driven spindle disposed intermediate of said idler pulleys and adapted to contact simultaneously both sections of the tape passing over the idler pulleys.

An object of this invention is the provision of an electro-magnetically controlled flywheel associated with a freely-rotatable pulley contacting the tape of a tape recorder.

An object of this invention is the provision of a novel arrangement for selectively altering the speed of travel of the magnetized tape in a tape recorder.

The novel features which I believe to characterize my invention are set forth in particularity in the appended claims. In order to understand the invention, both as to its organization and method, a completely detailed description of the specific embodiments and features hereof will now be given, especially in conjunction with the accompanying drawings in which:

Fig. 1 is the plan of the tape loop drive around the head assembly.

Fig. 1–*a* shows this plan when in the rewind position.

Fig. 1–*b* is the detail of the tape position indicator effective in the rewind position.

Figure 1:
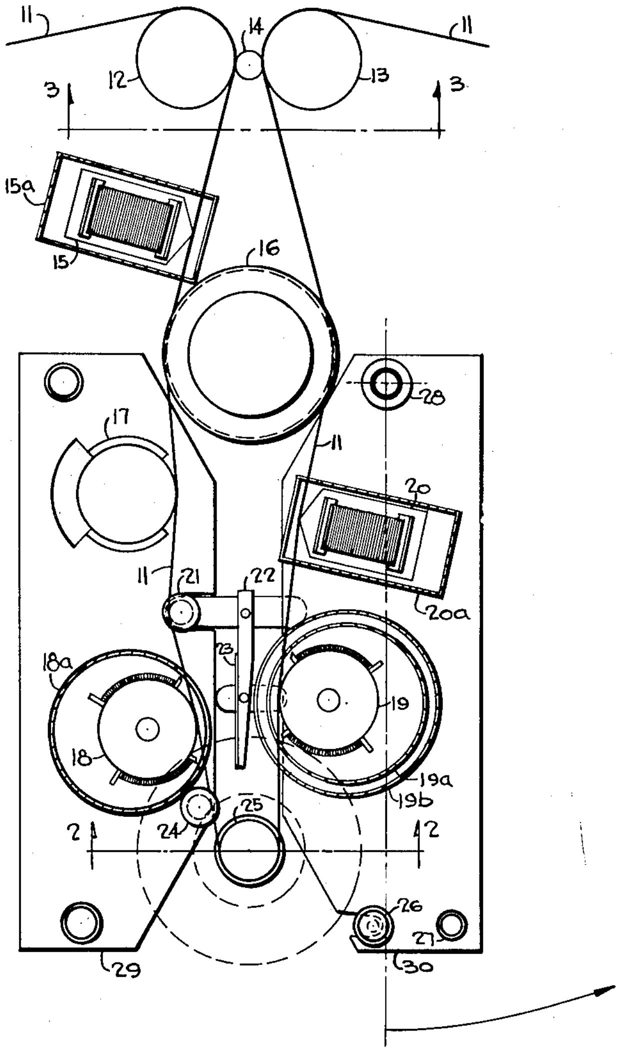
Figures 1A, 1B:
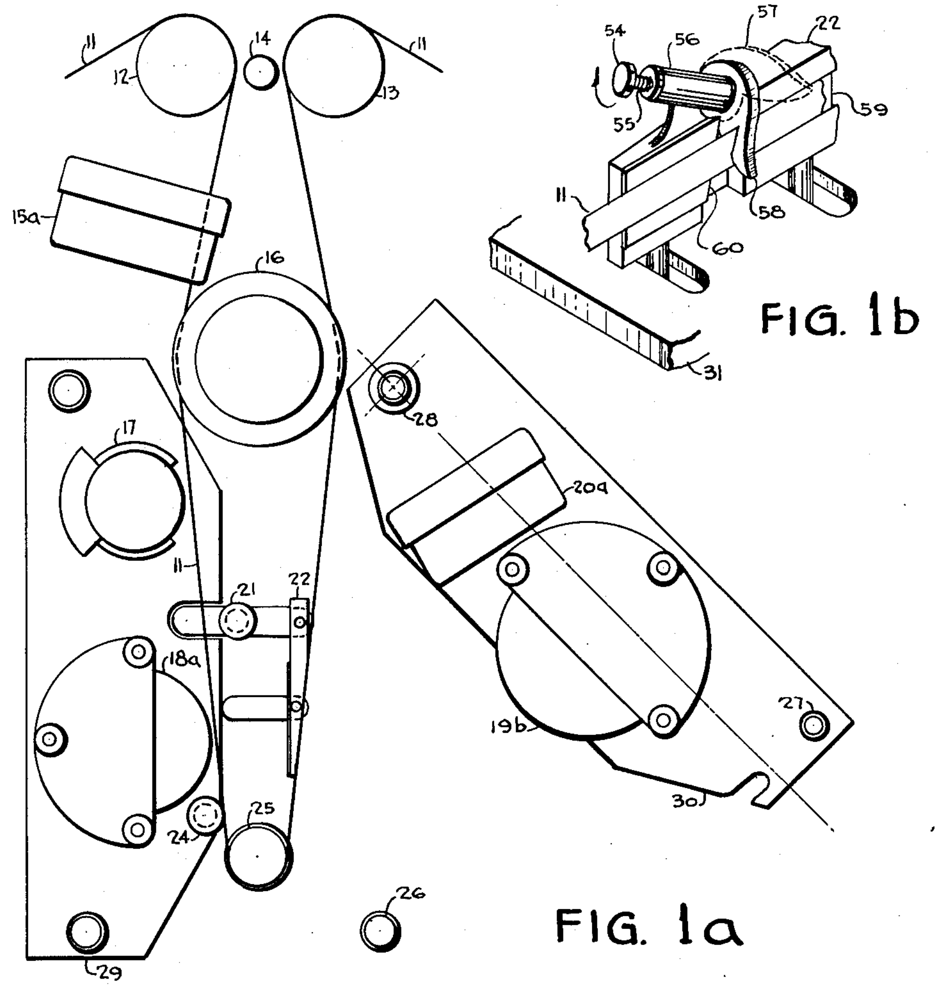

Reference is now made to Fig. 1 of the accompanying drawing which illustrates the novel layout of this invention. The tape 11, enters from a supply reel on the left not shown, and passes between the rubber idler pulley 12 and the rotating capstan 14. The tape then travels by the synchronizing playback head 15, and then proceeds around a first auxiliary flywheel 16 which serves to spread apart the tape at this point so that the tape will go by the remaining heads and on to the main flywheel capstan 25. This flywheel 16 is also used as the source of the counter to indicate tape footage which also may be calibrated as elapsed time. The counter being a conventional gear train is not shown. The tape then passes on down by the erase head 17 and the recording head 18, being held normally in contact with the magnetic gaps by the pusher idler 21. Then comes a small guide idler 24 to hold the tape in proper position as it passes around the main flywheel capstan 25. The tape then passes on up to the right by playback head 19 and then by the last of the magnetic heads, the synchronizing record head 20. Tape 11 then passes on by the right side of the first flywheel 16 on up to the driving point of the tape, between the rubber idler 13 and the capstan, or spindle, 14 and then carries on out to the right to the take up reel, not shown. The capstan 14 is of a novel conical, tapered, form which will be described later.

The record head 18 has a mumetal shield **18–*a* and the playback head 19 has a double mumetal shield 19–*a*** and

**19–*b*. The heads 17 and 18 are normally fastened down solidly to the plate 29. The heads 19 and 20 on the other hand, are mounted on a rotatable plate 30 which may be rotated about the pivot 28 at the top by loosening the screw support 26** at the bottom. Then when the plate holding these two heads is rotated to the right as is shown in Fig. 1–*a*, the tape pushoff 21 will also move to the right by a linkage underneath the table of the magnetic recorder, not shown, which will pull the support 22 together with the push-off 21 to the right and allow the tape to pass directly from flywheel 16 down to the capstan 25 of the main flywheel. The tape of course will also then be completely free of the playback head 19 and the synchronizing record head 20. This second position as shown in 1–*a* is used when the tape is to be rewound or rapidly advanced forward to get to a desired portion of the tape.

Figure 2:
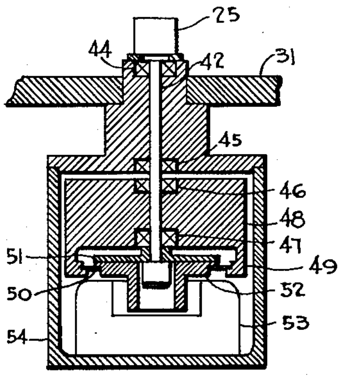
Fig. 2 is the detailed drawings of the magnetic clutch which releases the flywheel from its shaft and capstan on rewind.

To secure free passage of the tape on rewind it is also necessary to disengage the flywheels associated with capstan 25 and pulley 16. This is done by means of a magnetic clutch which is energized electrically by the operator or by contacts not shown on plate 30. This is best seen by reference to Fig. 2 which is a central cross-section taken along the line 2 of Fig. 1. The capstan, or pulley, 25 is shown at the top and it is supported on the main shaft 42 which carries on down through the housing 54. This housing 54 is fastened solidly to the top plate 31 which carries all the rest of the equipment. This housing has the ball bearings 44 and 45 which hold the center shaft 42 in place and this shaft 42 then carries on down to the main flywheel 48 which is rotatably supported on this shaft by the ball bearings 46 and 47. At the bottom of this shaft 42 is the flange, or disc, 51 which is rigidly attached to the shaft. An arcuate spring 50 supports a magnetic armature 52 from the side supports 49 of the flywheel 48. Normally this spring 50 has sufficient tension to hold the armature against the flange 51 and therefore maintain the flywheel in direct rotational contact with the main shaft. This means that the flywheel will turn with the shaft. This is for normal operation where the flywheel action is desired between the flywheel 48 and the capstan 25 on top engaging the tape 11 to hold the tape rigid. However, when the equipment is to be used in the rewind position the flywheel action should stop. To accomplish this the solenoid 53 is energized, bringing down the armature 52 against the spring action 50 and removing the armature 52 from contact with the flange 51. Then the flange and its directly connected shaft 42 will rotate without the flywheel 48. The flywheel 48 on the contrary will be braked by the fact that the armature 52 will be drawn down against the solenoid casing 53. This action will hold the armature still and this will be communicated through the spring 50 to the flywheel extension 49 and thence to the flywheel 48. This will mean that the flywheel will be rapidly braked. This then provides a convenient way for having the flywheel 48 in action during normal tape movement for recording or playback, and the flywheel 48 out of action for rewind or rapid forward advance.

The same flywheel action is provided for the auxiliary flywheel 16 so that its inertia too may be connected either to the top flange 16 for normal recording or playback, and also may be disconnected during rewind operations. Exactly the same mechanism is used for this purpose as above described for flywheel 48, so the description is not repeated for this flywheel. This means that both the auxiliary flywheel 16 as well as the main flywheel 48 operating through its capstan 25 have inertia during normal playing operations, and both have this inertia removed during rewind operations.

It is also to be noted that the movable shield 22 which lies in front of playback head 19 serves as an indicator of the exact position of the playback head gap on the tape before the tape stopped. Fig. 1–*b* shows this action in greater detail. This shield 22 carries a very small cutter assembly to cut the tape at an angle in a slot 59 into which the tape 11 falls as the slide 22 moves forward. A bearing 56 fastened to the left side of slide 22 holds an axle with a manual knob 54 which carries on down through the bearing 56 to the small cutting knife 57. A spring 55 tenses the knife back against a cutting edge 60 in the slide 22. Also this spring 55 normally keeps the knife rotated counterclockwise to the position 57 shown dotted. When it is desired to cut the tape at exactly the position where the playback head 19 was in contact with the tape 11 previously, this knob 54 is rotated clockwise to bring the knife down to its position 58, cutting the tape 11 at an angle suitable for splicing onto another similarly cut piece of tape.

The tape is threated around the capstans with the magnetic side towards the heads in all cases. This means that the uncoated side of the tape will be against fly wheels 16 and 25 and pushoff idler 21 so there will be less wear on the tape and also on the components affected. It is of course quite essential that the magnetic side of the tape be presented to the magnetic heads.

It will be noted also, that the synchronizing playback head 15 is in contact with the tape at all times. This is so that the synchronizing signal may be observed while the rewind or fast forward operations are carried on. This permits the observation on an oscilloscope of the output of this synchronizing playback head to identify where synchronizing signals as registered on the tape begin or end.

The physical contact of the tape with the synchronizing playback head is very light. In fact, it is actually possible to get a good synchronizing signal from the tape even when the latter actually does not have physical contact with the playback head 15. It is, however, essential that there be a slight tension of the tape against the synchronizing record head 20 so that a good synchronizing signal may be registered on the tape. This tension is also necessary on the erase head 17, record head 18 and playback head 19 to insure optimum operation. Generally speaking, however, greater tension is required on recording heads than on playback heads.

Figure 3:
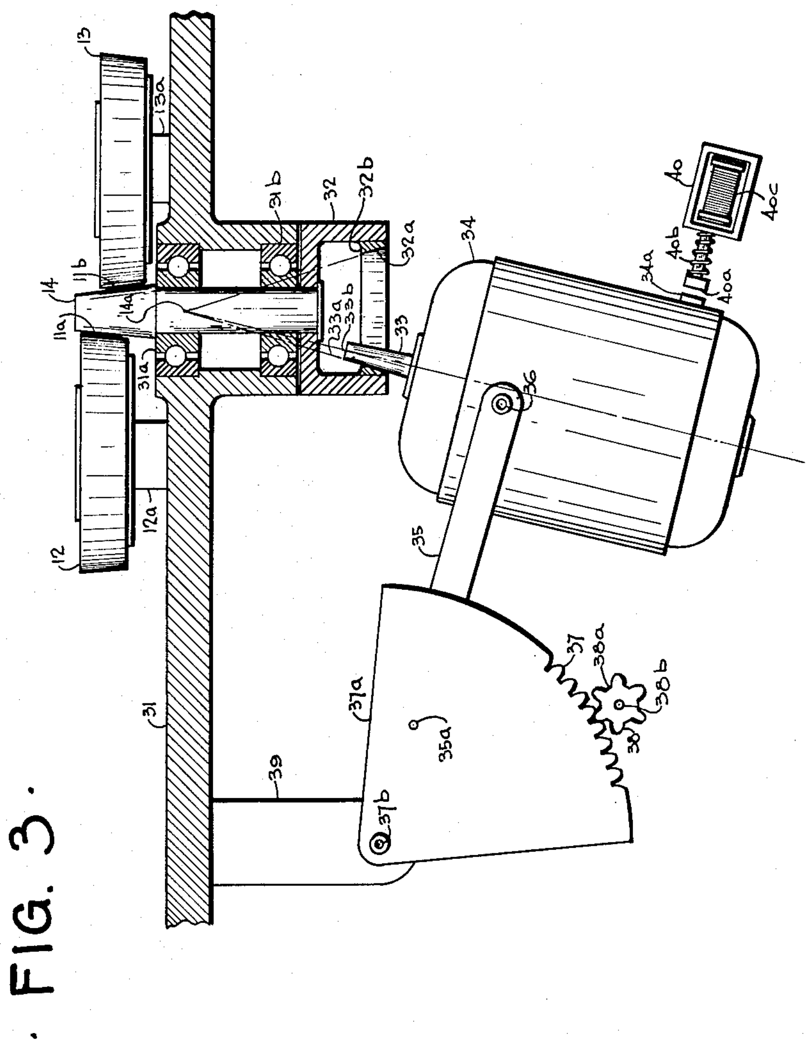
Fig. 3 is a detailed drawing of the synchronous motor drive with the rubber rim and the conical tape drive.

The motor drive turning the spindle 14 is best considered with reference to Fig. 3. This is a view taken down through the top plate of Fig. 1, as shown by the indications 3, on Fig. 1 and is an elevation taken through these points. It is seen that the top plate 31, is penetrated by a ball bearing 31–*a*, holding the center shaft 14, which has the conical capstan at its top end. At the bottom of this bearing 14, is a small flywheel 32, to which is cemented a rubber ring 32–*b* ground with an appropriate conical surface 32–*a*. This conical surface is engaged by the capstan 33 on the synchronous motor 34, which is supported by a flexible joint 36 in the lever arm 35, pivoted to the top plate 31 at the bearing 37–*b*. The motor 34 is raised or lowered by means of the portion of a gear 37, engaging with a pinion 38, which in turn is driven by a small motor, not shown, which is actuated by the operator in response to the synchronizing signal as displayed on an oscilloscope screen, or by suitable automatic circuits. When the equipment is not in use, a spring 40–*b* will push a bearing surface 40–*a* against a bearing surface 34–*a* on the synchronous motor 34 which will force the capstan 33 away from bearing against the rubber surface 32–*a*. When the equipment comes into service, solenoid 40–*c* will retract its armature with the bearing surface 40–*a* to the right, which will then allow motor 34 to rotate counterclockwise and capstan 33 will engage rubber surface 32–*a* and the tape driving power will carry up through flywheel 32 to capstan 14.

There are the two rubber idlers 12 and 13 engaging the capstan 14 on either side. It is to be noted that these also have conically ground surfaces and they are supported in the bearings 12–*a* for the 12 idler and 13–*a* for the 13 idler.

At the capstan 14 the tape may be guided in as 11–*a* with appropriate guides, not shown. An indication enlarged as to the thickness of the tape entering the tape loop around the heads is shown at 11–*a* next to capstan 14, and it is shown leaving the tape loop at a lower position 11–*b* on the right hand side of capstan 14 at 11–*b*. Of course the tape is only two mils thick and therefore, the dark mark indicating the tape in each case is greatly exaggerated. By trial, the relative tape height on the left entering side is made higher than that on the right at the tape leaving point 11–*b*, such that the greater diameter in the lower portion of the capstan 14 will try to pull the tape out faster than it enters at 11–*a*, and the net result will be that the tape will be stretched so that a continuous tension will be given to the tape as it passes around all the heads in the loop. It should be pointed out that there is also no slippage of the tape involved. The tape is actually stretched out more at point 11–*b* where it leaves the tape loop than it is at point 11–*a* where it enters the loop, and this difference in the stretching of the tape 11 produces the proper tension around the loop and maintains this tension constant, regardless of the quantity of tape on either the left or the right hand supply reels outside capstan 14 and the tape loop around the heads.

The conical surfaces are especially planned for the synchronous motor drive. A point 14–*a* has been selected along the axis of the capstan 14. This point 14–*a* is so selected that it is also the center line of the synchronous motor 34 with its capstan 33. The capstan 33 is so ground that its surface, if extended, would also center at point 14–*a*. Likewise, the rubber rim 32–*a*, solidly glued to the flywheel 32 is given the conical surface 32–*a*, which also if extended, would come to the point 14–*a*. With the surfaces so ground, there will be no slippage and consequent wear of any point where the metal cone 33 comes in contact with the rubber cone 32, and the net result will be a smooth relative motion of the motor with respect to the rubber rim and the flywheel. This is because the conical surface 32–*a* decreases proportionately to the decrease in the radius of corresponding points along 32–*a*. Now, however, it is possible to change the rate at which this rubber rim is turned by the simple expedient of moving the motor 34 with its capstan 33, in and out along the line 33–*a*. The capstan 33 should always maintain contact with the conical rubber surface 32–*a* along this line. It is therefore necessary to have the rotation of the supporting arm 35 holding the motor at the flexible joint 36 such that the motion of the joint 36, although on an arc about the axis 37*b*, is virtually a straight line extension of the line 33*a*, in such a manner that to all intents and purposes, the capstan follows the line 33–*a* as the synchronous motor is moved up or down. Within the limits required for tape speed change, this is quite possible, particularly, in view of the fact that the capstan 33 is contacting the flexible rubber rim 32. A double speed synchronous motor is used at 34 to give either 1800 R. P. M. or 900 R. P. M. with 60 cycle power. The capstan sizes and rubber rim are appropriately designed in diameters to give a tape speed of fifteen inches a second at the 1800 R. M. P. speed of the synchronous motor and to give seven and a half inches a second tape speed for the 900 R. P. M. speed of this motor 34. Appropriate dimensions for these elements are given in the following table:

| | Inches |
|---|---|
| Capstan 14— | |
| Small diameter | .600 |
| Large diameter | .665 |
| Capstan 33 of synchronous motor 34— | |
| Small diameter | .400 |
| Large diameter | .600 |
| Rubber rim— | |
| Inside small diameter | 1.900 |
| Inside large diameter | 2.100 |

It is always true that in maintaining speed, it is desirable to have all elements as uniform in movement as possible. The provision of the flywheel 32 with the capstan 14 is a step in this direction. The constant tension as generated between the tape entering 11–*a* and leaving at 11–*b* is also a great step forward in promoting this uniformity of tape movement, since such tension becomes independent of tension in the reels and of the amount of tape on the reels.

Although this particular type of drive has proved satisfactory for producing a loop of constant tension and controllable speed, it is not intended to restrict the invention to this particular combination of components. For example, instead of the tapered capstan drive at 14, it would be equally possible to use a capstan of two cylindrical diameters, slightly different. A further alternative would be to use two separate capstans of different diameters, driven by a single motor or by separate synchronous motors, or with the same diameter, but different rotational speeds. The special case in which a single cylindrical capstan or two capstans of equal linear speed are used, would be a means of accomplishing a part of this invention—the isolation of speed disturbances arising outside the constant speed zone.

It will also be apparent that the invention is operable without using all the features in toto. For example, in the event that it is not desired to use the variable planetary drive but change the frequency driving the synchronous motor, then the synchronous motor 34 may be placed directly in place of spindle 14 with a capstan on the end of the motor shaft duplicating the conical grinding as indicated on spindle 14 in Fig. 3.

There remains the consideration of the synchronizing heads; the synchronizing record 20 and the synchronizing playback head 15. As shown in my co-pending application Serial Number 84,510 these synchronizing heads work at right angles to the normal sound recording action. In other words the gaps in the heads for both of these toroids is parallel to the direction of the movement of the tape 11 instead of at right angles to the tape 11 as for normal sound recording and playback. This means that the tape is magnetized vertically with respect to the movement of the tape 11. With care this magnetic orientation can be made completely balanced with respect to the normal sound recording so that the synchronizing recording placed on this tape will not interfere in any way with the normal sound recording as has been pointed out in the referenced co-pending application. Now in the use of this synchronizing head, it has been found that it is perfectly possible to re-record a synchronizing signal over one that has already been recorded, to the extent that the first is erased and the new one superimposed on it, to establish new synchronizing on the tape.

This becomes particularly useful in dubbing operations where the engineer may wish to modify the relationship of the movement of this magnetic tape with respect to motion picture film or whatever else may be run jointly with the tape. Therefore, the synchronizing playback head 15 is placed well in advance of the synchronizing recording head 20 so that observations may be made of the motion of the tape 11 with respect to the synchronizing signal recorded on it, well ahead of the time when the same portion of the tape comes under the synchronizing recording head 20. This explains the positioning of the heads as shown in Fig. 1.

As explained in my co-pending application Serial No. 84,510, the normal sixty cycle current running the tape machine is used for this synchronizing energy. This is applied to this sychronizing recording head 20, and it only requires about two tenths of a volt across a 600 ohm recording head 20 to accomplish a very neat synchronizing recording on the tape. In its normal operating condition it is advantageous to have the length of the tape from where it is contacting the synchronizing playback head 15 around the complete loop of the tape 11 to the synchronizing recording head 20 equal to an integral multiple, plus one fourth, of a sixty cycle wave length on the tape. (With the tape running at 15 inches a second, the wave length at sixty cycles is one quarter of an inch on the tape.) The purpose of this is to make it possible to place a new synchronizing recording directly in phase with the existing one if it is not desired to change the synchronizing at any given point, as for example, when certain short sections only of the tape must be changed in step with the film with which they are synchronized for example. The quarter wave length allows for the fact that there is a ninety degree shift in the phase between the two heads, as the synchronizing signal placed on the tape is in exact phase with the energy in the recording head, whereas the playback energy is ninety degrees ahead of the energy on the tape. The exact position for the reproducing head is most readily found by trial.

What I claim and desire to secure by Letters Patent of the United States is:

1. Magnetic tape recording and reproducing apparatus comprising, in combination; a pair of adjacently-disposed idler pulleys; a capstan spaced from the idler pulleys; a magnetizable tape passing over adjacent peripheral surfaces of the idler pulleys and over the capstan to form an elongated loop constituting the operating zone of the tape; a power driven spindle disposed between the idler pulleys and in frictional, simultaneous contact with the tape as it passes over each idler pulley; a fixed plate carrying an erase head and a sound recording head; a pivoted plate carrying a sound reproducing head and a synchronizing signal recording head, said plate being movable laterally of the tape to a first position wherein the associated heads are disposed in operative position relative to the tape and to a second position wherein the associated heads are disposed in inoperative position relative to the tape; means actuated by the pivoted plate to move the tape into and out of operating position relative to the erase head and the sound recording head as the said plate is moved to the first and second positions, respectively; and a synchronizing signal reproducing head disposed between the said spindle and erase head, said synchronizing signal reproducing head remaining in operative position relative to the tape for all positions of the said pivoted plate.

2. Magnetic tape recording and reproducing apparatus comprising, in combination, a pair of adjacently-disposed idler pulleys, a magnetizable tape passing over adjacent peripheral surface portions of the idler pulleys and over the capstan to form an elongated loop constituting the operating zone of the tape, a power-driven spindle disposed between the idler pulleys and in frictional, simultaneous contact with the tape as it passes over each idler pulley, an erase head, and a plurality of recording and reproducing heads all operatively associated with the tape within the said operating zone, the sequential disposition of the capstan and all of the heads being as follows with respect to the direction of tape movement through the operating zone; a synchronizing signal reproducing head, the erase head, a sound recording head, the capstan, a sound reproducing head and a synchronizing signal recording head.

3. The invention as recited in claim 2, wherein the synchronizing signal recording and reproducing heads are spaced apart a distance substantially equal to an integer number of wave lengths plus one-quarter of a wave length of the signal frequency impressed upon the synchronizing signal recording head, said distance being measured along the tape.

4. The invention as recited in claim 2, wherein the peripheral surface of each idler pulley and of the spindle is tapered and the idler pulleys lie in spaced, parallel planes.

5. The invention as recited in claim 2 and including a pivoted plate carrying the sound reproducing head, said plate being movable to one position wherein the sound reproducing head is disposed in operative position relative to the tape and to another position wherein such head is disposed in inoperative position relative to the tape.

6. The invention as recited in claim 2 including a fly-wheel disposed within the tape loop, said tape frictionally contacting the peripheral surface of the fly-wheel at diametrically-opposed points.

7. Magnetic tape recording and reproducing apparatus comprising, in combination, a pair of adjacently-disposed idler pulleys, a capstan spaced from the idler pulleys, a magnetizable tape passing over adjacent peripheral surface portions of the idler pulleys and over the capstan to form an elongated loop constituting the operating zone of the tape, a power-driven spindle disposed between the idler pulleys and in frictional, simultaneous contact with the tape as it passes over each idler pulley, a sound recording head and an erase head operatively associated with the tape within the said operating zone, a pivoted plate carrying a sound reproducing head said plate being movable to one position in which the sound reproducing head is disposed in operative position relative to the tape and within the said operating zone and to another position wherein the sound reproducing head is disposed in inoperative position relative to the tape, and roller means actuated by said plate, said roller means moving the tape laterally into operative and inoperative position relative to the recording head as the pivoted plate is moved from one position to the other.

8. Magnetic tape recording and reproducing apparatus comprising, in combination, a pair of adjacently-disposed idler pulleys, a capstan spaced from the idler pulleys, a magnetizable tape passing over the adjacent peripheral surface portions of the idler pulleys and over the capstan to form an elongated loop constituting the operating zone of the tape, a power driven spindle disposed between the idler pulleys and in frictional, simultaneous contact with the tape as it passes over each idler pulley, a sound recording head and an erase head operatively associated with the tape within the operating zone, a pivoted plate carrying a sound reproducing head said plate movable to one position in which the sound reproducing head is disposed in operative position relative to the tape and within the said operating zone and to another position wherein the sound reproducing head is disposed in inoperative position relative to the tape, a visual indexing member movable relative to the said pivoted plate and adapted to contact the tape at the point corresponding to the operative point of the sound reproducing head, and a manually-operable tape-cutter carried by the said indexing member.

9. Magnetic recording and reproducing apparatus comprising, in combination, a pair of adjacently-disposed idler pulleys, a capstan spaced from the idler pulleys, a magnetizable tape passing over adjacent peripheral surface portions of the idler pulleys and over the capstan to form an elongated loop constituting the operating zone of the tape, a power-driven spindle disposed between the idler pulleys and in frictional, simultaneous contact with the tape as it passes over each idler pulley, a sound recording head, an erase head and a sound reproducing head, all said heads being operatively associated with the tape within the said operating zone, a fly-wheel pulley secured to one end of a shaft and in simultaneous contact with the tape at diametrically-opposed portions of the tape passing through the loop, a weight rotatable about the said shaft, a disc secured to the other end of said shaft, an armature, spring means connected between the armature and the weight said spring means normally biasing the armature into contact with the disc, and a solenoid operatively associated with the armature, said solenoid adapted, when energized, to overcome the normal bias of the spring means and move the armature out of contact with the disc.

10. Magnetic recording and reproducing apparatus comprising, in combination, a pair of adjacently-disposed idler pulleys, a capstan spaced from the idler pulleys, a magnetizable tape passing over adjacent peripheral surface portions of the idler pulleys and over the capstan to form an elongated loop constituting the operating zone of the tape, a spindle disposed between the idler pulleys and in frictional, simultaneous contact with the tape as it passes over each idler pulley, a sound recording head, an erase head and a sound reproducing head, all said heads being operatively associated with the tape within the said operating zone, a cup-shaped member secured to the said spindle, and including an axially-tapered friction ring secured to the inner wall, and an electric motor having a tapered shaft frictionally-contacting the said axially tapered friction ring.

11. The invention as recited in claim 10 wherein the motor is carried by a pivoted bracket, and including means retaining the bracket in a selected angular position.

References Cited in the file of this patent

UNITED STATES PATENTS

| | | |
|---|---|---|
| Re. 20,621 | Vogt | Jan. 11, 1938 |
| 1,831,562 | Keisler | Nov. 10, 1931 |
| 2,213,246 | Heller | Sept. 3, 1940 |
| 2,364,148 | Kellogg | Dec. 5, 1944 |
| 2,407,515 | Meyer | July 23, 1946 |
| 2,418,544 | Collins | Apr. 8, 1947 |
| 2,418,545 | Zimmerman | Apr. 8, 1947 |
| 2,466,153 | Chamberlin | Apr. 5, 1949 |
| 2,550,916 | Davis | May 1, 1951 |
| 2,558,432 | Halaski | June 26, 1951 |

FOREIGN PATENTS

| | | |
|---|---|---|
| 965,834 | France | Feb. 22, 1950 |

OTHER REFERENCES

S. M. P. E. Journal, Nov. 1948, pages 481–488.

Sound Recording, Frayne and Wolfe, pages 443, 444.